(12) United States Patent
Blyth et al.

(10) Patent No.: US 7,588,049 B2
(45) Date of Patent: Sep. 15, 2009

(54) POLYMERIC FIRE HYDRANT

(76) Inventors: Peter Compton Blyth, 1002 Foxdale Pl., Valrico, FL (US) 33595; David Lyle Bangs, 465 N. Fields Pass, Alpharetta, GA (US) 30004

( * ) Notice: Subject to any disclaimer, the term of this patent is extended or adjusted under 35 U.S.C. 154(b) by 0 days.

(21) Appl. No.: 11/079,684

(22) Filed: Mar. 14, 2005

(65) Prior Publication Data

US 2006/0201550 A1   Sep. 14, 2006

(51) Int. Cl.
 *E03B 9/02*   (2006.01)
(52) U.S. Cl. .................................. 137/294; 137/272
(58) Field of Classification Search ............... 137/272, 137/294, 296
See application file for complete search history.

(56) References Cited

U.S. PATENT DOCUMENTS

| | | | |
|---|---|---|---|
| 154,087 A | | 8/1874 | Roberts |
| 3,104,554 A | | 9/1963 | Mueller et al. |
| 3,439,938 A | | 4/1969 | Dunton |
| 3,523,549 A | * | 8/1970 | Anderson .................. 137/288 |
| 3,899,196 A | * | 8/1975 | Dashner ....................... 285/2 |
| 4,154,259 A | * | 5/1979 | Ellis et al. .................. 251/268 |
| 4,182,361 A | * | 1/1980 | Oakey ........................ 137/296 |
| 4,303,223 A | * | 12/1981 | Whisenhunt et al. ........ 251/357 |
| 4,550,876 A | * | 11/1985 | Kulesza et al. .............. 239/211 |
| 4,566,481 A | * | 1/1986 | Leopold et al. ............. 137/296 |
| 4,627,466 A | * | 12/1986 | Stark et al. ............... 137/625.5 |
| 4,651,772 A | * | 3/1987 | Carlin ........................ 137/299 |
| 4,827,969 A | * | 5/1989 | Lyasko ....................... 137/296 |
| 4,939,931 A | * | 7/1990 | Reeves ......................... 73/201 |
| 5,154,396 A | * | 10/1992 | Conley et al. ............... 251/309 |
| 5,199,684 A | * | 4/1993 | Maples .................... 251/30.01 |
| 5,303,961 A | * | 4/1994 | Popil .......................... 137/294 |
| 5,441,074 A | | 8/1995 | Kjaer |
| 5,514,310 A | * | 5/1996 | Sander ......................... 264/50 |
| 5,803,110 A | | 9/1998 | Segal |
| 6,375,864 B1 | * | 4/2002 | Phillips et al. ......... 252/301.33 |
| 6,605,329 B2 | * | 8/2003 | Bulters et al. .............. 428/64.1 |

* cited by examiner

*Primary Examiner*—Kevin L Lee
(74) *Attorney, Agent, or Firm*—Alberto Q. Amatong, Jr.; The Amatong Law Firm, PLLC

(57) ABSTRACT

The claimed universal polymeric molded fire hydrant is lightweight, weather resistant and will meet the UL, FM, NFPA and AWWA standards established for conventional metallic hydrants. Polymeric fire hydrants will also exceed standard performance expectations by eliminating rusting, binding, cracking and the associated need for periodic painting and lubrication. This polymeric fire hydrant costs less to produce than traditional metallic models providing significant costs savings to commercial and residential developers as well as municipalities. The inherent light weight nature of the units will reduce manpower and heavy equipment required to install it. This hydrant can be manufactured to resemble all existing traditional hydrant designs and performance specifications and will allow for future design modifications as future performance specifications and designs evolve.

16 Claims, 2 Drawing Sheets

POLYMERIC FIRE HYDRANT

CROSS REFERENCE TO RELATED APPLICATIONS

Not applicable

STATEMENT REGARDING FEDERALLY SPONSORED RESEARCH AND DEVELOPMENT

Not applicable

FIELD OF INVENTION

This invention relates generally to a polymeric fire hydrant and related integral components of universal design and functionality, and more particularly, the present invention is directed to a molded polymeric fire hydrant with associated barrel, cap, rod assembly, bonnet, standpipe, stem, elbow, foot, and internal valve.

This invention also relates to a improved commercial and residential emergency water supply housing, more particularly a hollow plastic housing, constructed of formulated durable weather resistant polymeric materials molded into a design suitable to enclose hydrant valves designed for effective control of water originating in buried high pressure water lines.

This invention is further concerned with the use of specified polymeric materials specifically formulated to overcome issues of cracking, binding, rusting and painting that are often associated with metallic hydrant bodies.

BACKGROUND ART

The present invention relates to a change in the material composition of standard conventional fire hydrants. Current high pressure fire hydrants manufactured from grey or ductile iron can be advantageously manufactured with formulated polymers. These new hydrants will yield cost savings arising from minimizing manufacturing and maintenance labor in addition to gaining fabrication flexibility while minimizing manufacturing costs. Additional safety gains will accrue in the products use from reduced labor claims related to the lifting of heavy hydrants during installation and in the reduction of impact related claims.

The impetus for the dramatic change in the use of materials came from research into functionality flaws of conventional metallic hydrants manufactured in grey or ductile iron since the 1800's. One common characteristic of fire hydrants as currently manufactured is in the use of metal, but not limited to, gray and ductile iron as the preferred material type. The standard exterior installation scenario of these metallic hydrants makes them particularly susceptible to rusting, binding, cracking, and the need for repeated labor-intensive painting and maintenance efforts. Plastic hydrants can be manufactured with filled polymeric materials that are not only less expensive to manufacture and install but also resist the cumulative effects of all climatic influences such as ultra violet degradation, color fading, rusting, cracking, temperature effects and heat resistance.

Much development and disclosure has occurred independently for fire hydrants and water regulating and metering valves. For example, U.S. Pat. No. 154,087 issued toby C. H. Roberts on Aug. 11, 1874 discloses a hydrantteaches use of a supplementary valve for use during hydrant repairs. U.S. Pat. No. 3,104,554 issued to F. H. by Mueller and J. J. Smith on Sep. 24, 1963, discloses a fire hydrant teaches use of a removeable valve seat ring, improved valve sealing technologies, improved valve stem coupling and operating techniques and improved top plate securing techniques. Further, U.S. Pat. No. 3,439,938 issued to J. T. by Dunton on Apr. 22, 1969, also discloses a fire hydrant teaches the use of frangible structure to minimize impact damage. However, no developments have been directly made to create a compounded polymeric hollow shell to replace heavy ductile iron housings in residential application to solve attendant operational shortcomings unique to ductile iron residential and commercial fire hydrant shells. Also, no attempts have been disclosed to develop an inexpensive, lightweight, weather resistant colorfast compounded polymeric hydrant that can be placed over every existing commercially produced water control valve and residential water line. replace the metallic housings currently used to protect every existing commercially produced fire hydrant water control valve.

Existing hydrants are currently manufactured in a plurality of sizes and shapes specific to a particular manufacturers design and meeting all UL, FM, NFPA, and AWWA performance standards. Polymeric fire hydrants offer the necessary flexibility in manufacturing design and production to allow for the fabrication of all sizes and shapes of hydrants specific to any particular manufacturer and will also meet the UL, FM, NFPA, and AWWA performance standards.

Safety issues also come into play when reviewing the potential for property damage and personal injuries after a collision between a moving body and fixed metallic hydrant takes place. By utilizing a softer more impact resistant polymeric hydrant, the resultant damage to the hydrant or impacting object will be substantially mitigated. Most conventional metallic fire hydrants employ a standard design feature allowing for the hydrant to "give way" at the safety stem coupling as a result of a significant impact. Most impacts with a standard ductile hydrant, which are brittle in nature, render them un-repairable and requiring immediate replacement. A collision with the present polymeric invention will typically result in a shearing of the stem coupling and lower flange polymeric bolts, but will not require the replacement of the hydrant body nor expensive repairs to the impacting object.

The manufacturing of polymeric based articles is inherently more cost effective than the casting of articles from various metals. Plastics naturally lend themselves to higher volume and more cost effective production runs with higher yields of acceptable parts. Reasons for this include the low formulation costs, high throughput molding process and typically do not require the post casting finishing operations necessary in metal casting operations.

Plastic components are also inherently lighter than metallic components of the same design resulting in less labor and associated support equipment such as forklifts and lifting cranes. Typical back injuries resulting from the movement of heavy objects will be minimized.

In view of the foregoing, there is a need for a polymeric fire hydrant in residential and commercial, rural and metropolitan fire protection applications that can effectively mitigate the maintenance, performance and safety issues associated with metallic hydrants while simultaneously lowering manufacturing, installation and maintenance costs.

SUMMARY OF THE INVENTION

The present invention relates to a change in the material composition and method of manufacture of standard conventional commercial and residential fire hydrant. More specifically, the invention dictates a transition away from the general usage of providing for a novel means of manufacturing hydrants that are now commonly manufactured from grey or ductile iron to the use of formulated plastic polymers of various compositions.

DESCRIPTION OF THE PREFERRED EMBODIMENT

Figure 1:
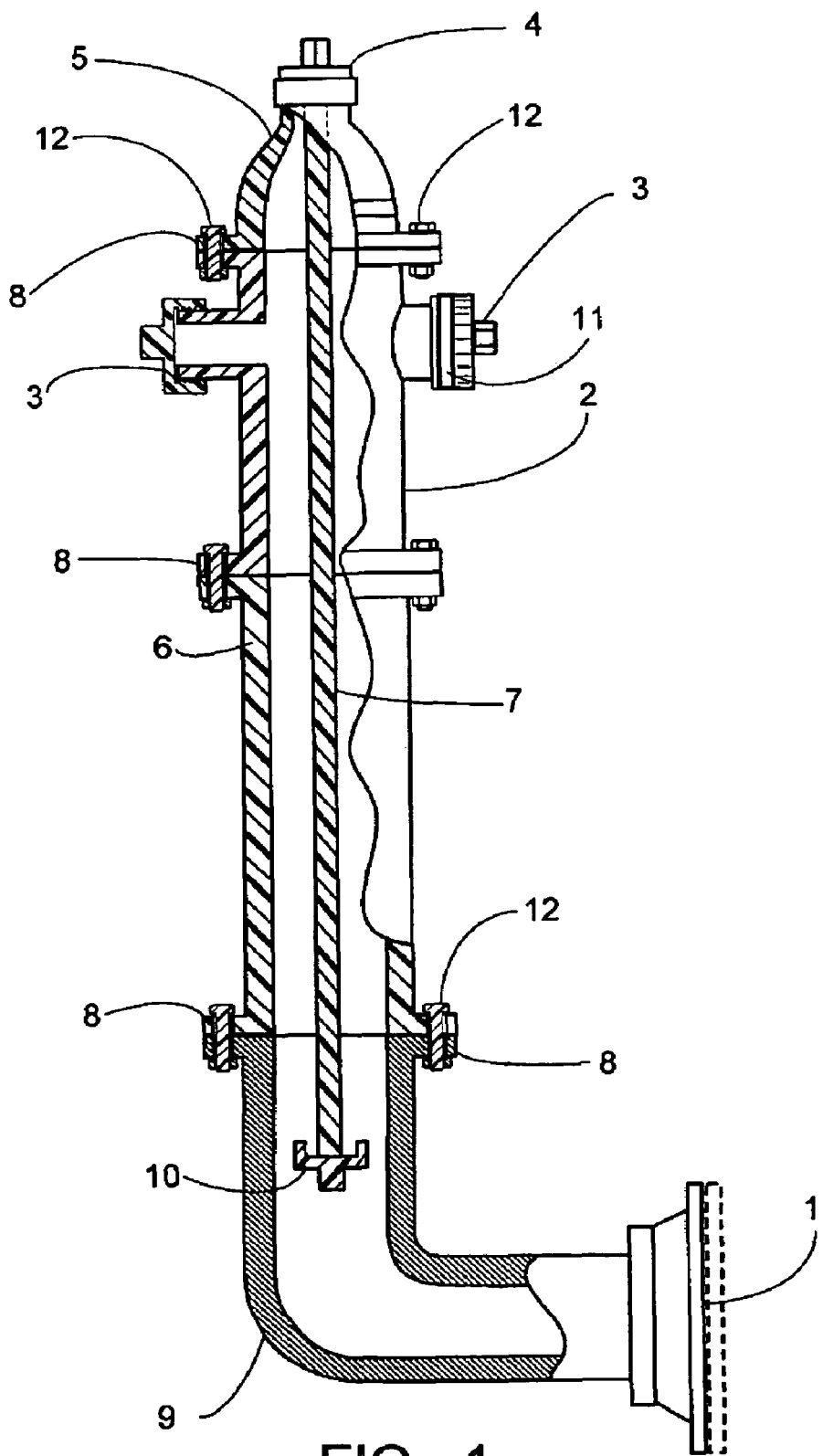
FIG. 1 is a frontal elevational view of a standard fire hydrant specifying polymeric vs metallic components.
Figure 2:
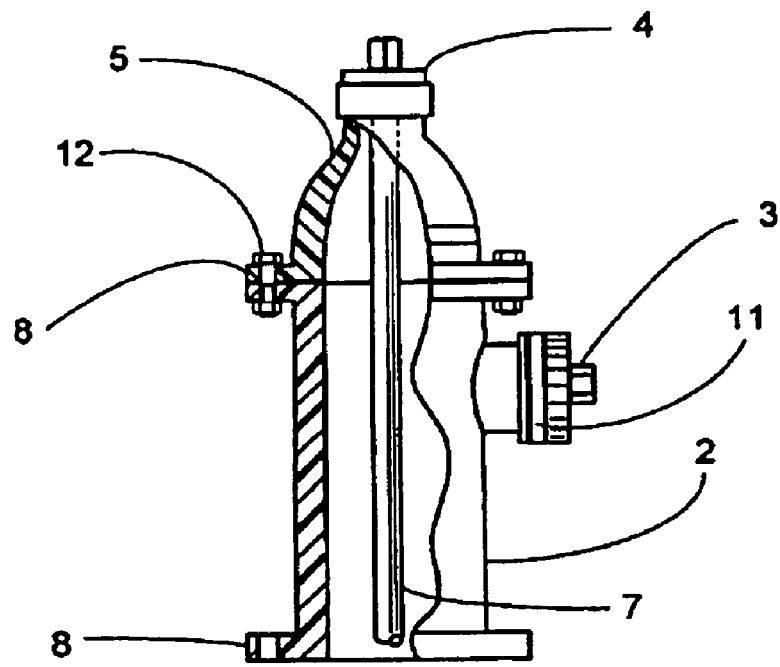
FIG. 2 is a longitudinal section view taken on the line 2'-2" of FIG. 1.

Broadly speaking, the multi-component unit which connects to a water main (1) composed of a hydrant barrel (2), cap (3), rod assembly (4), bonnet (5), standpipe (6), stem (7), flanges (8), foot (9) and internal valve (10) can be manufactured to any number of design style(s), utilizing polymeric thermoplastic and thermoset materials, filled and unfilled, suitable to perform to UL, FM, NFPA and AWWA standards.

In reference to the drawings, we have identified specific key components of the hydrant body starting with the molded bonnet (5) through which the upper rod stem and operating nut protrude (4). The bonnet (5), designed to prevent water and debris from entering the housing. The bonnet (5) is molded with reinforced UV resistant and color fast polymer and is designed to rest on top and in direct line with the upper barrel (2). The bonnet (5) is a concave hollow shell with a welded or molded in flange (8).

This hollow bonnet (5) is located at its exterior apex allowing for the valve stem (7) to protrude and be manually turned operating an internal valve. The base of the bonnet (5) is fabricated with a welded or integrally molded peripheral flange (8) designed to join and be detachably secured to an equally sized flange (8) welded or molded to the upper barrel (2).

Figure 3:
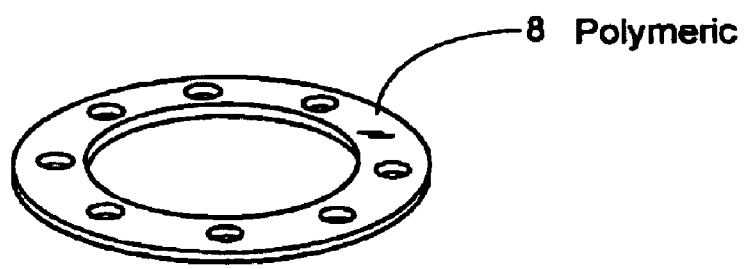
FIG. 3 is a cross-sectional view taken along line 3'-3" of FIG. 1
Figure 4:
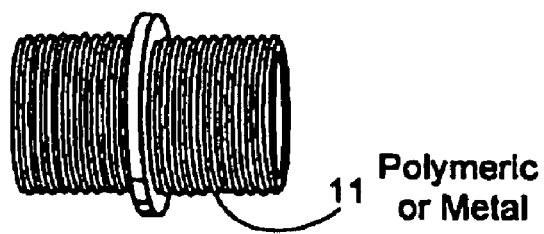
FIG. 4 is a longitudinal section view taken along line 4'-4" of FIG. 2

The flush flanges (8) are joined and secured circumferentially spaced threaded holes in FIG. 3 designed to receive appropriately sized nylon or steel threaded bolts (12). This method of attachment allows for the simple access and repair of any internal upper valve (7) or valve stem (10) as illustrated in FIG. 1.

The hollow upper barrel (5) and attendant welded or integrally molded upper flange (8) will also include 1-4 circumferentially spaced polymeric nozzles (14) welded or integrally molded at the appropriate circular side wall cavities. The number will be dependant on each individual field requirement. The reinforced polymeric nozzles (14) will be so constructed with ample sidewall dimensions so as to easily receive 1-4 threaded hose connectors (11) so attached through compression and affixed securely using recessed set screws or other suitable means. Each threaded hose connector will be covered by a threaded polymeric nozzle cap (3) so designed as to readily receive a wrench if one is called for to loosen or tighten the cap.

The hollow upper barrel (2) will terminate at its base with a welded or integrally molded replaceable and frangible peripheral flange (8) designed to join and secure it to an equally sized flange (8) welded or integrally molded to the top portion of the lower barrel. The flush peripheral flanges are joined and secured by means of nylon or steel threaded bolts (12). This method of attachment allows for the simple access and repair of any internal lower valve assemblies (10). The use of the welded or integrally moled frangible flange (8) also aids in and promotes fracture upon impact with minimal damage to either section.

The hollow lower barrel (6) will be so constructed with a welded or integrally molded replaceable and frangible peripheral flange (8) designed to join and secure it to an equally sized flange (8) welded or integrally molded to the lower portion of the upper barrel. The lower barrel (6) will terminate at its base with a welded or integrally molded peripheral flange (8) designed to join and secure it to an equally sized attendant welded or integrally molded upper flange (8) attached to the hydrant elbow or shoe (9). Both flanges (8) are designed to join and be detachably secured to an equally sized opposing flange. The flush flanges are joined and secured by means of circumferentially spaced threaded holes designed to receive appropriately sized nylon or steel threaded bolts. This method of attachment allows for the initial connection to fit most any existing connecting pipe (1) as well as allow for simple access for future repair of any internal valve components. The elbow or shoe (9) is a molded angular tube so designed to be void of projections and cavities to obstruct flow or collect sediment.

The elbow or shoe terminates with an opening with an appropriately sized female receiving flange (1) designed to receive standard underground high pressure water feed lines. The elbow or shoe (9) is protected from corrosion by the use of reinforced, color fast, non-corrodible polymer.

The hollow upper barrel (2) and lower barrel (6) will be molded one piece filled polymeric cylinders of similar dimensions as standard residential and commercial hydrants. The side walls will be constructed of the appropriate thickness of polymer suited to readily sustain in excess of 200 PSI working strength, 250 PSI burst strength and 400 PSI hydrostatic test pressure and will conform to all UL, FM, NFPA and AWWA standards.

In one embodiment, the polymeric fire hydrant can be manufactured from a wide variety of amorphous, semi-crystalline & crystalline thermoplastic and thermoset plastic resins commonly known to those versed in the art to include; ABS, acetal, alkyds, ASA, polymethylmethacrylate, cellulose acetate propionate, cellulose acetate butyrate, CPVC, diallyl phthalate, epoxies, ethylene vinyl acetate, liquid crystal polymers, nylons, PCT, PCTA, PCTG, PEEK, phenolic, polyarylamide, polyarylsulfone, polybutylene, polybutyleneterephthalate, polyphthalamide, polyphenylene ether, polyphenylene oxide, polycarbonate, polyester, polyethylene, polyethermide, polyethersulfone, polyimide, polyketone, polymethylpentene, polyphenylenesulfide, polypropylene, polystyrene, polysulfone, polyurethane, polyvinylchloride, PVDC, SAN, SB, SBS, SMA, thermoplastic elastomers, TPO, fluoropolymers, including alloys and composites of the above listed materials.

In one embodiment, the current invention will employ polymers that are by their inherent molecular structures, significantly lighter in weight that conventional metallic hydrants. Lighter unit weights translate to less manpower required to handle, maneuver and install original or replacement equipment.

In one embodiment, the current invention will, by the inherent nature of polymeric materials eliminate rusting, cracking and the need to apply any protective, thermosetting epoxy coatings to the hydrant shoe as required by AWWA C550-81 standards.

In one preferred embodiment, the polymeric fire hydrant will be manufactured optimizing high impact resistant, flame resistance, and chemical resistance at an optimum cost point. Preferred polymers meeting this set of criteria are ABS, acetal, BMC, nylon(s), polybutylene terephthalate, polycarbonate, polyester(s), polyphenylene oxide, SMC and alloys such as PC/ABS and PC/PET.

In one embodiment, the polymeric fire hydrant can be manufactured by standard forming techniques commonly known to those versed in the art to include; injection molding, extrusion, compression molding, resin transfer molding, reaction injection molding, low pressure molding, casting and thermoforming, machining, pultrusion, multi-component molding, transfer molding, co-injection molding, gas assist injection molding, structural foam molding, blow molding, rotational molding, lost core molding, pressure forming, vacuum forming, expanded head foam molding, injection compression molding, thermoplastic injection molding, thermoset injection molding, co-injection sandwich molding, fusible core molding, soluble core molding, slide core molding and insert molding.

In one preferred embodiment the hydrant will be manufactured utilizing injection molding with either slide core molding or lost core molding techniques to effectively mold into the device the various openings commonly found in a hydrant without having to resort to welded component parts.

In one embodiment the polymeric fire hydrant can be manufactured utilizing a wide variety of reinforcement techniques and materials including; woven fiber or roving, aramid fibers, carbon fibers, carbon spheres, glass fiber, glass beads, hollow glass spheres, metal fibers, metal flakes, metal powders, nanocomposites, mica platelets, mineral platelets, clay, talc, calcium carbonate, antioxidants, antistatics, blowing agents, colorants (dyes and pigments), coupling agents, foaming agents, fungicides, mildewcides, long glass fiber, continuous glass filament, stainless steel fiber, PTFE, heat stabilizers, protective coatings, lubricants, mold release agents, nucleating agents, plasticizers, fire retardants, smoke suppressants and other additives known to those skilled in the art.

In one preferred embodiment the devise can be manufactured with antioxidants and UV stabilizers to provide UV stability and protect the polymeric hydrant against material degradation and ensure color stability.

In one preferred embodiment the polymeric hydrant can be manufactured with molded in colorants appropriate for each municipalities flow rate color code and or color preferences. The molded in colorants will eliminate costly repainting measures.

In one preferred embodiment the polymeric hydrant can be manufactured with molded in fluorescent color(s) allowing for rapid identification and location of hydrants in low light conditions.

In one preferred embodiment the polymeric hydrant can be manufactured with lubricants, either internal or external to ensure that all plastic to plastic and plastic to metal components do not bind but rather glide smoothly past each other without the pitting, galling and subsequent seizing and binding typically found between dissimilar metal surfaces and conforming to UL, FM, NFPA and AWWA standards.

In one preferred embodiment the polymeric hydrant can be manufactured with glass fiber fillers at loading levels from 0% to 70% by weight, more preferably 30% to 50% by weight, designed to minimize differential material expansion rates between polymeric and metallic components, such as between brass thread inserts and the polymeric body and/or caps of the hydrant.

In one embodiment, the current invention can be manufactured to conform to UL, FM, NFPA, and AWWA approved standard classifications. The manufactured hydrant will contain the required number and size of hose connections. Hydrant sizes will include, but not be limited to the currently accepted AWWA standards of 4½ and 5¼ inches.

In one embodiment the polymeric fire hydrant functioning components to include but not limited to nuts and bolts (12), valves, valve stems, flanges, couplings, gaskets, rod assemblies, retainer rings, valve facings, shoes and elbows, can be fabricated from either metallic or polymeric materials.

In one embodiment, the current invention can be designed and manufactured so that the operating threads on the hose and steamer valves, can be polymeric or metallic or a combination of both, and will be of a national standard. The operating hose connection threads (11) can be either replaceable or permanently affixed to the hydrant body.

In one embodiment the polymeric fire hydrant design can allow for:

(1) quick connect pressure resistant type fittings allowing for rapid hose connections; and (2) the use of quick clamp type connection fittings allowing for rapid repair access to the upper rod/stem assemblies.

In one embodiment, the current polymeric invention shall be so designed that, in the event of a strong impact, the main hydrant body will breakaway at a non-critical joint, along with the main valve rod allowing for the main valve to remain closed.

That which is claimed is:

1. A fire hydrant installation comprising:
   a substantially polymeric main hydrant body having a plurality of components including an upper barrel, cap, and bonnet, wherein one or more of said components are manufactured from polymer material, wherein side walls of said barrel is constructed to sustain at least 200 PSI working strength and at least 250 PSI burst strength, and wherein the upper barrel includes a polymeric lower flange connected with polymeric bolts to provide a non-critical breakaway joint of the main hydrant body;
   a stem assembly extending downwardly from the main hydrant body and including a stem coupling configured to give way with the non-critical breakaway joint; and
   a water main conduit interconnected in selective fluid communication with the main hydrant body, the water main conduit including a water main valve operably attached with the stem assembly at the coupling.

2. The fire hydrant installation of claim 1, wherein said polymer material is selected from the group consisting of: amorphous, semi-crystalline, crystalline, thermoplastic and thermoset plastic resins.

3. The fire hydrant installation of claim 1, wherein the components of the main hydrant body are joined by polymeric welding.

4. The fire hydrant installation of claim 1, wherein at least one of the main hydrant body components is made of a polymer material characterized by a UV resistant color selected to correspond to a specific flow rate color code.

5. The fire hydrant installation of claim 1, wherein the barrel is made of a polymer material characterized by a UV stabilizers to minimize light induced degradation.

6. The fire hydrant installation of claim 1, further including a standpipe connected in fluid communication with the upper barrel, wherein the standpipe and main hydrant body are made of a polymeric material.

7. The fire hydrant installation of claim 1, wherein the main hydrant body is manufactured with metallic and polymeric subassemblies.

8. The fire hydrant installation of claim 1, wherein the main hydrant body further includes threaded inserts.

9. The fire hydrant installation of claim 1, wherein the main hydrant body further includes metallic and polymeric mechanical part connections such as nuts, bolts, clamps and nozzle cap retaining device.

10. The fire hydrant installation of claim 1, wherein said polymer material is selected from the group consisting of: ABS, acetal, alkyds, ASA, polymethylmethacrylate, cellulose acetate propionate, cellulose acetate butyrate, CPVC, diallyl phthalate, epoxies, ethylene vinyl acetate, liquid crystal polymers, nylons, PCT, PCTA, PCTG, PEEK, phenolic, polyarylamide, polyarylsulfone, polybutylene, polybutyleneterephthalate, polyphthalamide, polyphenylene ether, polyphenylene oxide, polycarbonate, polyester, polyethylene, polyethermide, polyethersulfone, polyimide, polyketone, polymethylpentene, olyphenylenesulfide, polypropylene, polystyrene, polysulfone, polyurethane, polyvinylchloride, PVDC, SAN, SB, SBS, SMA, thermoplastic elastomers, TPO, fluoropolymers, including alloys and composites of the above listed materials.

11. A fire hydrant installation comprising:
   a main hydrant body including an upper barrel and a bonnet fitted above the upper barrel, wherein each of the upper barrel and bonnet is made of a polymeric material;
   a lower standpipe attached in fluid communication with the upper barrel by way of a flange connection and extending generally downwardly therefrom;
   a stem assembly including a rod extending from proximate the bonnet downwardly through the upper barrel and standpipe, and a coupling located at a distal end;
   a foot disposed in fluid communication with the standpipe on a downstream end and with a water main conduit on an upstream end; and
   an internal valve situated in the foot and operably attached with the coupling such that the valve is operable by the stem assembly to fluidly communicate the main hydrant body with the water main conduit; and
   wherein the connection between the upper barrel and standpipe provides a non-critical breakaway joint at which the main hydrant body gives way relative to the standpipe.

12. The fire hydrant installation of claim 11, wherein the non-critical breakaway joint further includes a polymeric flange of the upper barrel and a set of polymeric bolts securing the polymeric flange with the standpipe.

13. The fire hydrant installation of claim 12, wherein the non-critical breakaway joint further includes a metallic flange of the standpipe to which the polymeric flange is attached.

14. The fire hydrant installation of claim 12, wherein the stem rod is metallic, the coupling being a second non-critical breakaway joint configured to give way with the first non-critical breakaway joint.

15. The fire hydrant installation of claim 11, wherein the main hydrant body includes a plurality of pressure bearing components including the upper barrel and the bonnet, each of the components being polymeric such that the main hydrant body is substantially polymeric.

16. The fire hydrant installation of claim 11, wherein each of the stem rod and the coupling is polymeric, the polymeric stem rod further providing a second non-critical breakaway joint.

* * * * *